(12) United States Patent
Li et al.

(10) Patent No.: US 8,705,413 B2
(45) Date of Patent: Apr. 22, 2014

(54) APPARATUS AND METHOD FOR TRANSMITTING ACK/NACK IN TDD SYSTEM

(75) Inventors: Yingyang Li, Beijing (CN); Ju-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 198 days.

(21) Appl. No.: 13/066,982

(22) Filed: Apr. 29, 2011

(65) Prior Publication Data

US 2011/0267995 A1 Nov. 3, 2011

(30) Foreign Application Priority Data

Apr. 30, 2010 (CN) .......................... 2010 1 0176422

(51) Int. Cl.
*H04J 3/00* (2006.01)
(52) U.S. Cl.
USPC ........... 370/280; 370/329; 370/335; 370/342; 370/437; 370/476; 455/68; 455/452.1; 714/749; 714/776
(58) Field of Classification Search
USPC ......... 370/280, 329, 335, 338, 342, 437, 476; 455/68, 452.1; 714/749, 776
See application file for complete search history.

(56) References Cited

U.S. PATENT DOCUMENTS

| | | | | |
|---|---|---|---|---|
| 5,404,355 | A * | 4/1995 | Raith | 370/311 |
| 7,774,686 | B2 * | 8/2010 | Ahn et al. | 714/776 |
| 8,165,035 | B2 * | 4/2012 | Che et al. | 370/252 |
| 8,194,603 | B2 * | 6/2012 | Nimbalker et al. | 370/329 |
| 8,310,919 | B2 * | 11/2012 | Worrall | 370/229 |
| 8,341,481 | B2 * | 12/2012 | Lee et al. | 714/748 |
| 8,347,164 | B2 * | 1/2013 | Lee et al. | 714/749 |
| 8,457,091 | B2 * | 6/2013 | Pani et al. | 370/342 |
| 2005/0013263 | A1 * | 1/2005 | Kim et al. | 370/320 |
| 2008/0253318 | A1 * | 10/2008 | Malladi et al. | 370/328 |
| 2009/0046649 | A1 * | 2/2009 | Gao et al. | 370/329 |
| 2009/0225700 | A1 * | 9/2009 | Shen et al. | 370/328 |
| 2009/0241004 | A1 * | 9/2009 | Ahn et al. | 714/749 |
| 2009/0279460 | A1 * | 11/2009 | Sarkar | 370/280 |
| 2009/0300456 | A1 * | 12/2009 | Pelletier et al. | 714/749 |
| 2010/0027447 | A1 * | 2/2010 | Choi et al. | 370/280 |
| 2010/0039997 | A1 * | 2/2010 | Ratasuk et al. | 370/329 |
| 2010/0098012 | A1 * | 4/2010 | Bala et al. | 370/329 |

(Continued)

FOREIGN PATENT DOCUMENTS

EP 2154806 A2 2/2010

OTHER PUBLICATIONS

Written Opinion of the International Searching Authority dated Jan. 2, 2012 in connection with International Patent Application No. PCT/KR2011/003162.

(Continued)

*Primary Examiner* — Andrew Lai
*Assistant Examiner* — Andrew C Lee

(57) ABSTRACT

The present invention provides a method and apparatus for transmitting an ACK/NACK in a TDD system. A component carrier (CC) configuration for a user equipment (UE) and a transmission mode of each CC are received. An ACK/NACK feedback mode is selected based on an overhead status for feedback in an uplink. An ACK/NACK is processed according to the selected feedback mode. And the ACK/NACK is transmitted in the uplink. The method provided by the present invention can avoid excessive overhead for feedback in uplink in various extreme circumstances while ensuring satisfying performances of downlinks under many configurations.

20 Claims, 4 Drawing Sheets

(56) References Cited

U.S. PATENT DOCUMENTS

| | | | |
|---|---|---|---|
| 2010/0195624 A1* | 8/2010 | Zhang et al. | 370/335 |
| 2010/0202373 A1 | 8/2010 | Chun et al. | |
| 2010/0210256 A1* | 8/2010 | Shen et al. | 455/422.1 |
| 2010/0215011 A1* | 8/2010 | Pan et al. | 370/329 |
| 2010/0220606 A1* | 9/2010 | Niwano | 370/252 |
| 2010/0227569 A1* | 9/2010 | Bala et al. | 455/73 |
| 2010/0234037 A1* | 9/2010 | Terry et al. | 455/450 |
| 2010/0238984 A1* | 9/2010 | Sayana et al. | 375/219 |
| 2010/0271970 A1* | 10/2010 | Pan et al. | 370/252 |
| 2010/0272042 A1* | 10/2010 | Chun et al. | 370/329 |
| 2010/0272048 A1* | 10/2010 | Pan et al. | 370/329 |
| 2010/0285809 A1* | 11/2010 | Lindstrom et al. | 455/450 |
| 2011/0002276 A1* | 1/2011 | Chen et al. | 370/329 |
| 2011/0051694 A1 | 3/2011 | Cho et al. | |
| 2011/0103498 A1* | 5/2011 | Chen et al. | 375/260 |
| 2011/0103510 A1* | 5/2011 | Gaal et al. | 375/295 |
| 2011/0105137 A1* | 5/2011 | Gaal et al. | 455/452.1 |
| 2011/0170495 A1* | 7/2011 | Earnshaw et al. | 370/329 |
| 2011/0205976 A1* | 8/2011 | Roessel et al. | 370/329 |

OTHER PUBLICATIONS

International Search Report dated Jan. 2, 2012 in connection with International Patent Application No. PCT/KR2011/003162.

* cited by examiner

APPARATUS AND METHOD FOR TRANSMITTING ACK/NACK IN TDD SYSTEM

CROSS-REFERENCE TO RELATED APPLICATION(S) AND CLAIM OF PRIORITY

The present application is related to end claims priority under 35 U.S.C. §119(a) to a Chinese patent application filed in the Chinese Intellectual Property Office on Apr. 30, 2010, and assigned Serial No. 201010176422.6, the entire disclosure of which is hereby incorporated by reference.

TECHNICAL FIELD OF THE INVENTION

The present invention relates to mobile communication. More particularly, the present invention relates to an apparatus and a method for transmitting an ACK/NACK in a TDD system.

BACKGROUND OF THE INVENTION

Long Term Evolution (LTE) system is based on hybrid automatic repeat request (HARQ) for data transmission. That is, a data receiver selects to return an acknowledgement (ACK) or a negative acknowledgement (NACK) based on whether the data received is correct. Dynamic scheduling of downlink data transmission is achieved through a physical downlink control channel (PDCCH). For semi-persistent scheduling (SPS), initial transmission of SPS data does not need transmission of the PDCCH, but SPS data retransmission needs to be scheduled through the PDCCH.

For an LTE Frequency Division Duplexing (FDD) system, when multiple input-multiple output (MIMO) is adopted for downlink data transmission, two code words (CWs) are generally transmitted in parallel, and a user equipment (UE) will need to feed back two ACK/NACK accordingly. When downlink data is not transmitted via MIMO, only one CW is transmitted, and so the UE will need to feed back only one ACK/NACK accordingly. In contrast, for an LTE TDD (TDD) system, when the number of downlink sub-frames is greater than the number of uplink sub-frames, at least one uplink sub-frame will have to include ACK/NACK for downlink data of multiple downlink sub-frames. In this situation, method A obtains one ACK/NACK bit for each CW by performing a logical and (AND) operation on ACK/NACK for each sub-frame data downlink. However, the downlink data transmission is dynamically scheduled via PDCCH, and the UE may not correctly receive the PDCCH sent by the base station, resulting in different interpretation of the ACK/NACK bit obtained through the above method A between the data sender and the data receiver. To solve this problem, the LTE Time Division Duplexing (TDD) system adopts downlink allocation indication (DAI) which enables the UE to detect whether the PDCCH in one or more downlink sub-frames is lost during the data transmission. In M downlink sub-frames (where M is an integer larger than or equal to 1) corresponding to an uplink sub-frame, the DAI field in the PDCCH of each downlink sub-frame is used for indicating: up to the current downlink sub-frame, the total number of downlink sub-frames in which PDCCH is sent by the base station, and the value of DAI may be '1', '2', '3', or '4'. However, it cannot be detected by utilizing DAI that the last several PDCCH are missed, so the LTE TDD system further requires a UE to return an ACK/NACK in an ACK/NACK channel which is determined by the last sub-frame where a PDCCH is received. Therefore, the base station may determine whether the UE has missed the PDCCH in the last one or multiple sub-frames according to the ACK/NACK channel occupied by the UE. Another method, method B, involves obtaining an ACK/NACK for each sub-frame. If MIMO is adopted for data transmission, an ACK/NACK is obtained by space bundling, and the ACK/NACK composed of multiple bits is transmitted via QPSK modulation in an ACK/NACK channel selected from multiple ACK/NACK channels. In LTE systems, the number of the multiple bits is '2', '3', or '4'.

In an enhanced long-term evolution (LTE-A) system, in order to support higher transmission rates, multiple carrier components (CCs) are combined through carrier aggregation (CA) to obtain a larger operating bandwidth. For example, five CCs, each of which has a bandwidth of 20 MHz, can be combined in order to obtain an operating bandwidth of 100 MHz. By adopting CA, the base station is able to transmit downlink data to a UE via multiple CCs, and accordingly, the UE needs to feed back ACK/NACK for the downlink data transmitted via the multiple CCs. Generally, the more accurate the ACK/NACK is, the better the downlink performance will be, but meanwhile the uplink resource overhead and design complexity will be increased accordingly. For an LTE-A TDD system adopting CA, many bits are needed by the UE as the ACK/NACK to be returned. For example, when M equals four and the number of CCs is five, supposing the UE is configured to perform MIMO transmission, the UE needs to return ACK/NACK for forty transmission blocks (TBs) at the most. Specifically, if NACK and DTX (Discontinuity Transmission (TX)) are not distinguished (ACK/NACK is usually divided into three states: ACK—the downlink data is successfully received, NACK—downlink data is detected but received unsuccessfully, DTX—downlink data is not detected), 40-bit ACK/NACK will be fed back; and if NACK and DTX are distinguished, 47-bit ACK/NACK will be fed back. Obviously, so many bits of ACK/NACK being fed back at one time will greatly increase the uplink resource overhead, and will lead to a reduction in uplink coverage. Because the LTE-A uplink control channel of the existing system does not have such a huge feedback volume, a new feedback channel structure needs to be defined to support such a huge bit overhead, which will place higher requirements and increase the complexity and difficulty in implementing the devices.

SUMMARY OF THE INVENTION

To address the above-discussed deficiencies of the prior art, it is a primary aspect of the present invention to provide an apparatus and a method for transmitting ACK/NACK in a TDD system, which can achieve a balance between downlink performances and uplink resource overhead, and meanwhile reduce uplink resources occupied by transmission of ACK/NACK.

To attain the above objectives, the specific solution in accordance with this invention is as follows.

According to an aspect of the present invention, a method for transmitting an acknowledgement indicator (ACK/NACK) in a TDD system is provided. A component carrier (CC) configuration for a user equipment (UE) and a transmission mode of each CC is received. An ACK/NACK feedback mode is selected based on overhead information for feedback in an uplink. An ACK/NACK is processed according to the selected feedback mode. And the ACK/NACK is transmitted in the uplink.

The ACK/NACK feedback mode may include performing no bundling procedure for the ACK/NACK, and directly feeding back an ACK/NACK for each transmission block, or compressing the ACK/NACK according to a method which reduces the number of bits in the ACK/NACK.

According to another aspect of the present invention, an apparatus for transmitting an acknowledgement indicator (ACK/NACK) in a TDD system is provided. The apparatus includes a receiver, a hybrid automatic repeat request (HARQ) controller, and a transmitter. The receiver receives a component carrier (CC) configuration for a user equipment (UE) and a transmission mode of each CC. The HARQ controller selects an ACK/NACK feedback mode based on overhead information for feedback in an uplink. And the transmitter processes an ACK/NACK according to the selected feedback mode and transmits the ACK/NACK in the uplink.

In view of the above technical schemes, the method and apparatus for transmitting ACK/NACK in a TDD system provided by the present invention can help to avoid excessive overhead for feedback in uplink in various extreme circumstances while ensuring downlink performances under many configurations. As such, uplink feedback in various situations has similar amount of overhead, thereby eliminating the need of designing dedicated feedback channels and feedback manners for extreme situations where an ACK/NACK of the maximum number of bits is to be fed back. In this way, requirements, implementation complexity, and difficulty level of devices can be reduced.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
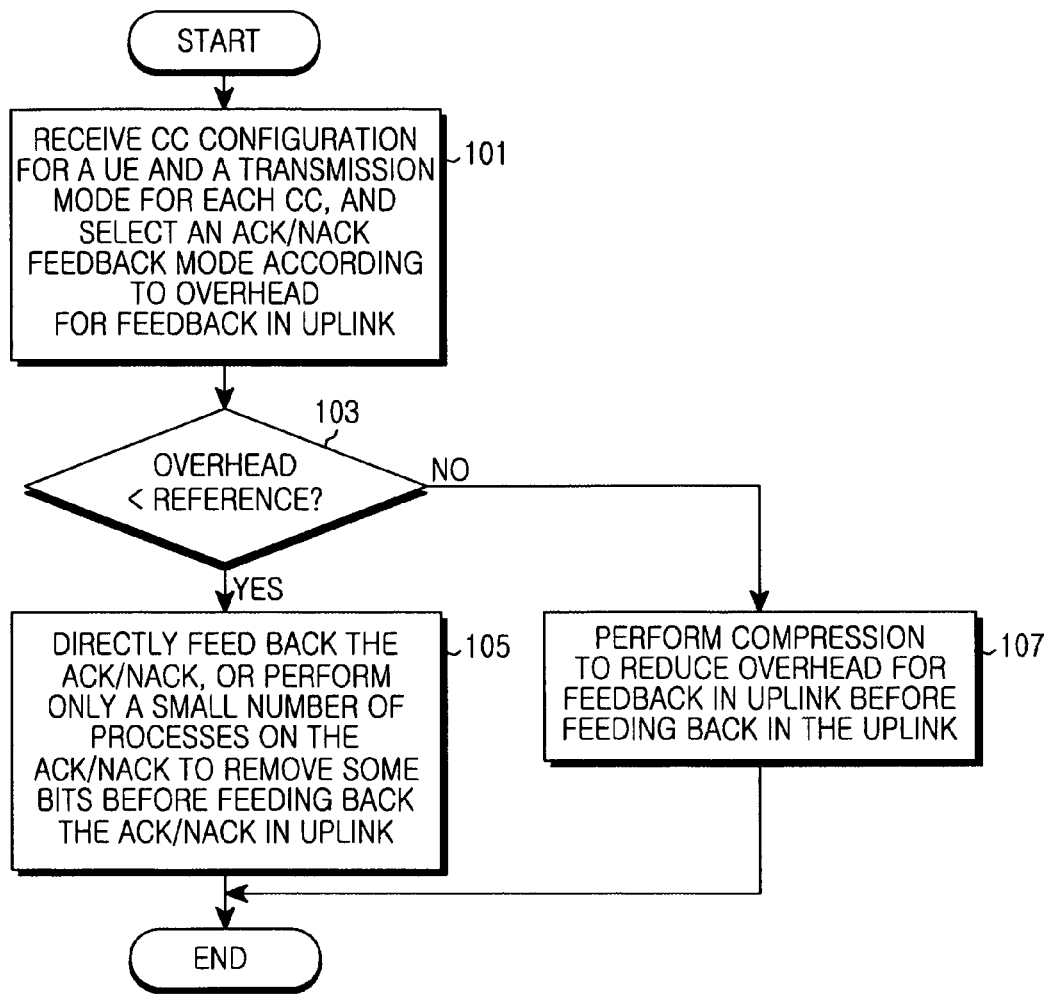
FIG. 1 illustrates a process for transmitting ACK/NACK in a TDD system in accordance with an embodiment of the present invention.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Embodiments of the present invention will be described herein below with reference to the accompanying drawings. In the following description, well-known functions or constructions are not described in detail since they would obscure the invention in unnecessary detail. Terms described below, which are defined considering functions in the present invention, can be different depending on user and operator's intention or practice. Therefore, the terms should be defined on the basis of the disclosure throughout this specification.

The present invention is hereinafter further described in detail with reference to the accompanying drawings as well as embodiments so as to make the objective, technical solution and merits thereof more apparent.

As illustrated in the background art part, for a TDD system, ACK/NACK for data in multiple downlink sub-frames may have to be fed back within one uplink sub-frame (denoting the number of downlink sub-frames as M) under certain uplink-to-downlink ratio configurations. Taking LTE system as an example, the value of M may be '2', '3', or '4'. In addition, for an LTE-A system adopting CA, the base station may configure downlink data transmission to a UE in multiple downlink CCs at the same time. For an LTE-A TDD system, the number of bits needed to be fed back in uplink as ACK/NACK depends on: the value of M, the number of CC configured for the UE to receive, and whether MIMO is adopted for downlink data transmission.

The larger the value of M is, the more the bits needed to be fed back in the uplink as the ACK/NACK will be. Supposing the number of CCs is five (the number of CCs can be five at the most in LTE-A CC) and MIMO is adopted for downlink data transmission, when NACK and DTX are not distinguished from each other, the maximum number of bits needed to be fed back as ACK/NACK is forty when M equals four, the maximum number of bits is thirty when M equals three, and the maximum number of bits is twenty when M equals two. In practice, a typical value of M is two and is usually adopted in certain common configurations of uplink-to-downlink ratio configurations, so priority should be given to the optimization of feeding back ACK/NACK when M equals two.

Furthermore, the more the CCs configured for the UE to receive, the more the bits that are needed for uplink feedback as ACK/NACK will be. Supposing M equals four and MIMO is adopted for downlink data transmission, when NACK and DTX are not distinguished with each other, the maximum number of bits needed for returning ACK/NACK when five CCs are configured for the UE to receive is forty, and the maximum number of bits needed when two CCs are configured for the UE to receive is sixteen. In most situations, a UE is configured to receive a small number of CCs (usually means two or three CCs are configured for the UE), and only in some extreme situations are more CCs configured for a UE (usually means four or five CC are configured for the UE). Thus it should given priority to optimize the feeding back of a collective ACK/NACK for a small number of CCs.

Based on the above analysis, the present invention provides a method for transmitting ACK/NACK in a TDD system. The process of the method is as shown in FIG. 1.

In step 101, CC configuration for a UE and a transmission mode of each CC is received, and an ACK/NACK feedback mode is selected according to overhead for feedback in uplink. For example, the UE compares the overhead for feedback in uplink with a reference value in step 103. Step 107 is performed when the overhead is equal to or greater than the reference value, while step 105 is performed when the overhead is less than the reference value.

In step 105, ACK/NACK is fed back directly, or the ACK/NACK is processed with a small amount of processing to remove some bits, and the processed ACK/NACK is fed back in uplink.

In step 107, compressing ACK/NACK removes as many bits as possible to reduce the overhead for feedback in uplink, and the compressed ACK/NACK is fed back in uplink.

When step 101 is applied to common situations (i.e., when the value of M is small and the number of CCs needed to be aggregated is small), because the number of bits needed for feeding back the ACK/NACK is substantially less than the maximum number of bits, step 105 can be directly performed to optimize the performance of downlink data transmission. In comparison, when step 101 is applied to some extreme and rare situations (i.e., when the value of M is larger and the number of CCs needed to be aggregated is larger), the number of bits of the ACK/NACK to be fed back is high, thus step 107 is performed, i.e., more processing are needed to largely reduce overhead for feedback in uplink before the ACK/NACK is fed back in uplink.

It should be noted that the basis for selecting a proper ACK/NACK feedback mode may be the value of M, the number of CCs configured for the UE to receive or whether MIMO is adopted for downlink data transmission. Alternatively, the basis may be the total number of CWs in all the CCs that are configured for the UE to receive, and is irrelevant to the value of M. The number of CWs in each CC is two when MIMO transmission is adopted, and is one when MIMO transmission is not adopted. The basis may also be the maximum number of TBs in all the CCs configured for the UE, the number of bits needed for feeding back ACK/NACK in uplink, or be any combination of the above mentioned bases.

The process of FIG. 1 may select two different ACK/NACK feedback modes by comparing the above basis with a threshold. In fact, if there are m (m is larger than one) thresholds, m+1 ACK/NACK feedback modes can be selected.

According to the number of bits supported by the uplink for feedback, ACK/NACK for each downlink data may be processed respectively. When the ACK/NACK needs to be compressed, an embodiment of the present invention utilizes bundling method. Bundling refers to a process through which the number of bits of multiple ACK/NACKs can be reduced. Available bundling techniques may include: spatially bundling which bundles ACK/NACK for two CWs transmitted in a sub-frame via MIMO; time bundling which bundles ACK/NACK for multiple sub-frames in a CC; or inter-CC bundling which bundles ACK/NACK for multiple CCs. Bundling generally refers to any process that may reduce the number of bits and may include, but is not limited to, the logic and operations mentioned above. In order to further describe the feedback mode, the following lists several possible ACK/NACK feedback modes. The following are only examples, so the present invention is not limited to the following embodiments for reducing bit overhead of ACK/NACK.

The first ACK/NACK feedback mode does not involve any bundling procedure, and ACK/NACK for each TB is directly fed back. In this situation, NACK and DTX are not distinguished from each other to reduce the overhead. The NACK and the DTX may also be distinguished in order to increase the accuracy of the ACK/NACK.

The second ACK/NACK feedback mode includes bundling ACK/NACKs for data in at most M sub-frames, and the bundling is performed on each CW, i.e., when MIMO transmission is adopted, ACK/NACK for two CWs in a CC are bundled and fed back by the UE respectively.

The third ACK/NACK feedback mode includes spatially bundling each sub-frame to obtain an ACK/NACK, and bundling the bundled ACK/NACKs for at most M sub-frames. In this way, one ACK/NACK after bundling is fed back for each CC.

The fourth ACK/NACK feedback mode includes bundling ACK/NACKs for downlink data transmitted in multiple CCs, or utilizing both the bundling of ACK/NACKs for multiple CCs and the bundling of ACK/NACKs for multiple sub-frames in one CC. In contrast to the correlation of ACK/NACKs between multiple sub-frames in one CC, ACK/NACKs between data transmitted in different CCs have little correlation, which makes bundling ACK/NACKs for data in multiple CCs have a larger impact on the performance of downlink data transmission.

The method for bundling and bit-compressing ACK/NACKs will be described in detail with reference to specific examples.

Figure 2:
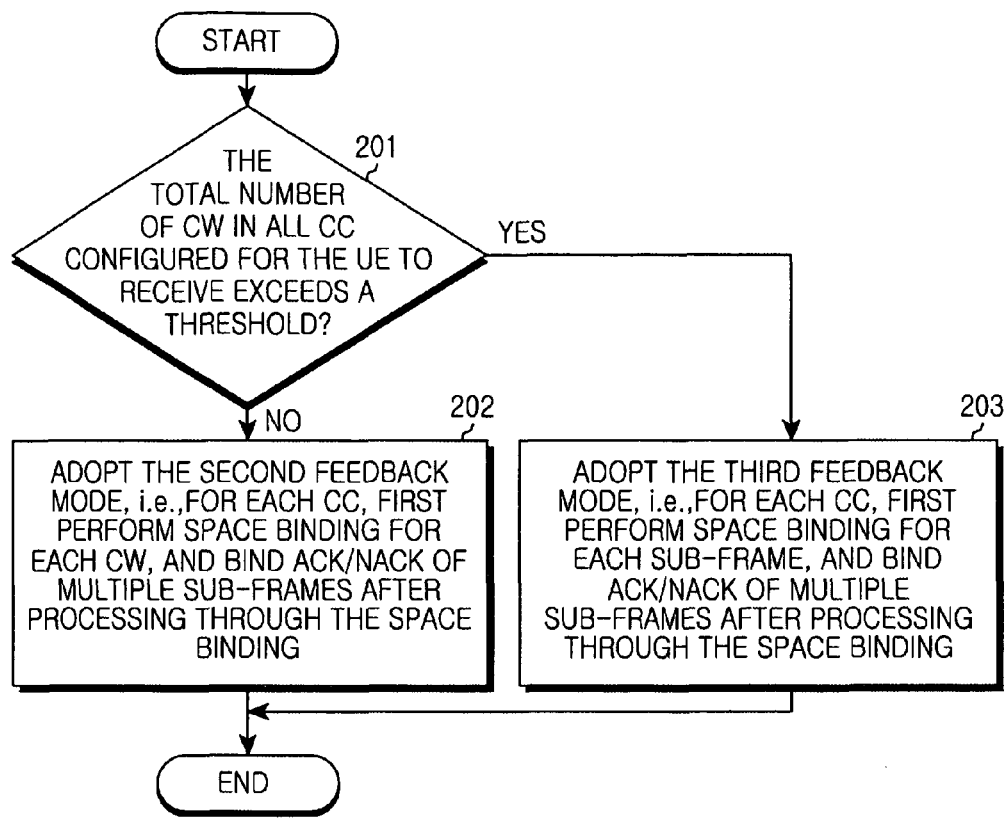
FIG. 2 illustrates a process of selecting an ACK/NACK feedback mode according to an embodiment of the present invention.

According to the embodiment illustrated in FIG. 2, suppose the ACK/NACK transmission mode is selected based on the total number of CWs in all CCs configured by the base station for the UE to receive. First, it is judged whether the total number of CWs in all the CCs configured by the base station for the UE to receive exceeds a threshold (step 201). Supposing the threshold is '4', i.e., when the total number of CW is less than or equals '4', the second ACK/NACK feedback mode is adopted, i.e., bundling ACK/NACKs for data transmitted in at most M sub-frames in one CC, and the bundling is performed for each CW respectively (step 202). Supposing five bundling states can be obtained by bundling ACK/NACKs for multiple sub-frames of each CW, taking the total number of CW is '4' as example, the number of bits needed to feed back ACK/NACKs in uplink is ceil($\log_2(5^4)$)=10, where the ceil ( ) is an operation for getting a maximum integer of a value.

When the total number of CWs is larger than '4', the third ACK/NACK feedback mode is adopted, i.e., space bundling is performed first for each sub-frame to obtain an ACK/NACK, then the ACK/NACK are bundled for up to M sub-frames after the space bundling (step 203). Supposing five bundling states can be obtained by bundling ACK/NACKs of multiple sub-frames in each CC, taking the base station that has configured five CCs for the UE to receive as an example, the number of bits needed for feeding back ACK/NACKs in uplink is ceil($\log_2(5^5)$)=12.

Figure 3:
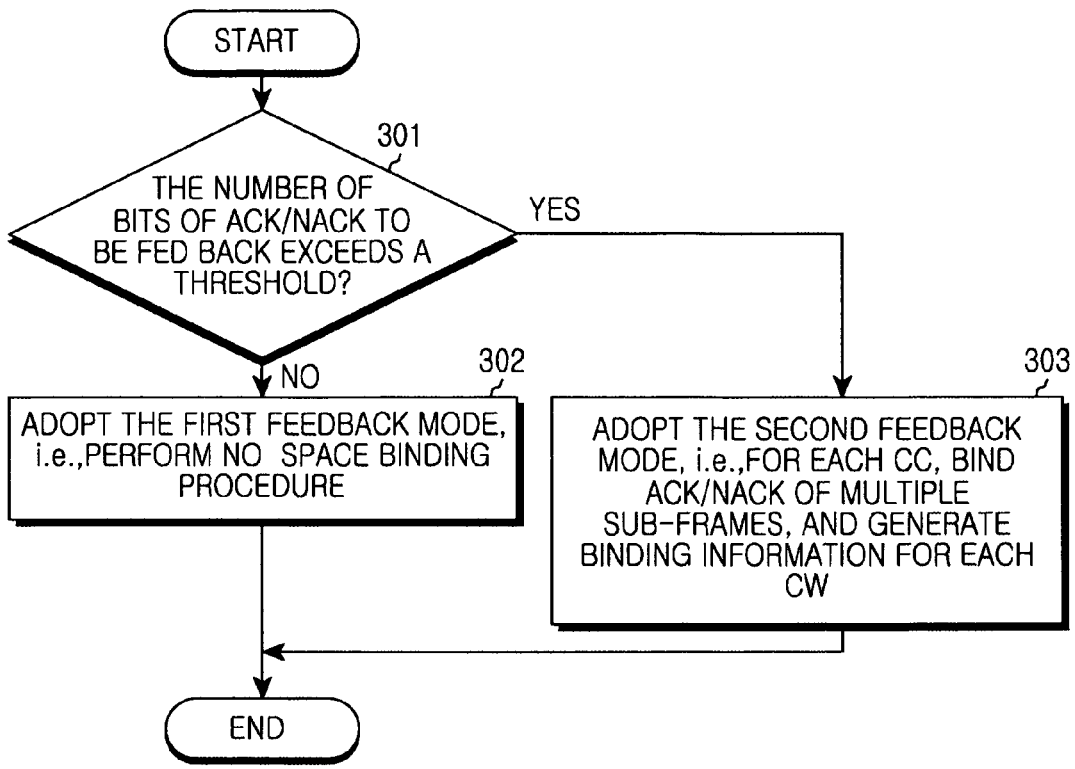
FIG. 3 illustrates a process of selecting an ACK/NACK feedback mode according to an embodiment of the present invention.

According to the embodiment illustrated in FIG. 3, supposing the ACK/NACK transmission mode is selected based on the number of bits needed for feeding back ACK/NACKs without any bundling, it is first judged whether the number of bits of the ACK/NACK to be fed back exceeds a threshold (step 301), supposing the threshold selected is '16' bits.

Taking the value of M equals four as an example, when the maximum number of TBs in all CCs configured by the base station for the UE to receive equals 16 and the number of bits of the ACK/NACK is less than or equals 16', the first ACK/NACK feedback mode is adopted, i.e., no bundling procedure will be performed (step 302).

When the maximum number of TBs in all CCs configured by the base station for the UE to receive is larger than '16' and the number of bits of the ACK/NACK is larger than '16', the second ACK/NACK feedback mode is adopted, i.e., bundling ACK/NACKs for data transmitted in up to M sub-frames in one CC, and the bundling is performed for each CW respectively (step 303). Furthermore, supposing five bundling states can be obtained by bundling ACK/NACK for multiple sub-frames corresponding to each CW, and five CCs are configured by the base station for the UE to receive and are all transmitted via MIMO, the total number of TBs is '40', and accordingly, the number of bits of the ACK/NACKs to be fed back in uplink is ceil($\log_2(5^{10})$)=24.

Figure 4:
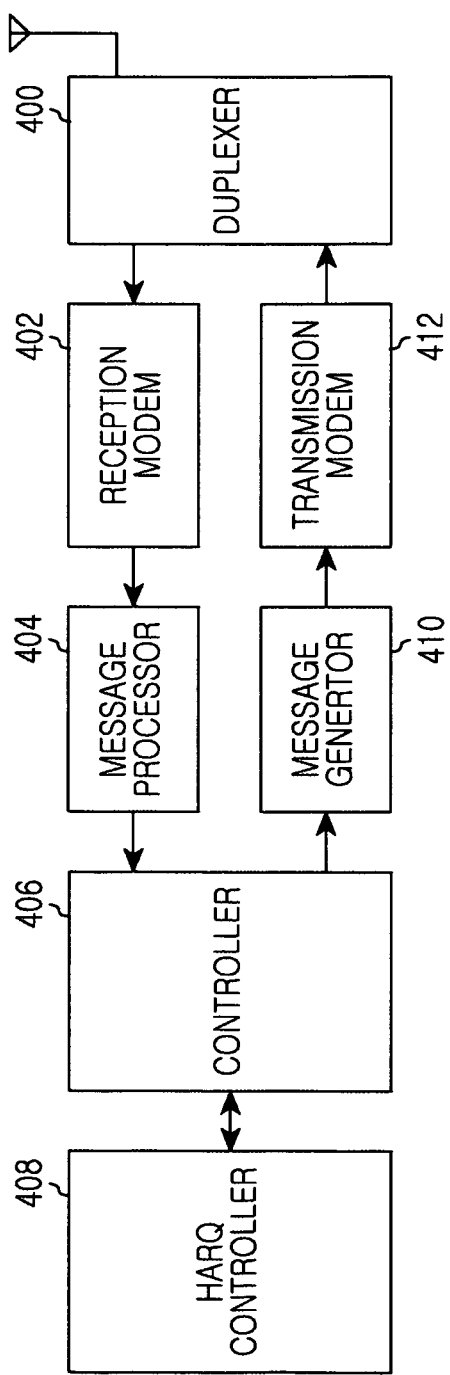
FIG. 4 is a block diagram of an ACK/NACK transmitter in TDD system according to an embodiment of the present invention.

FIG. 4 is a block diagram of an ACK/NACK transmitter in TDD system according to an embodiment of the present invention.

As illustrated in FIG. 4, the UE includes a duplexer 400, a reception modem 402, a message processor 404, a controller 406, a HARQ controller 408, a message generator 410, and a transmission modem 412.

The duplexer 400 transmits a signal provided from the transmission modem 412 through an antenna according to a duplexing scheme, and provides a receive signal from the antenna to the reception modem 402.

The reception modem 402 converts and demodulates a Radio Frequency (RF) signal provided from the duplexer 400 into a baseband signal. The reception modem 402 can include an RF processing block, a demodulation block, a channel decoding block and such. The RF processing block converts an RF signal provided from the duplexer 400 into a baseband signal according to the control of the controller 406. The demodulation block is composed of a Fast Fourier Transform (FFT) operator and such for extracting data loaded on each subcarrier from a signal provided from the RF processing block. The channel decoding block is composed of a demodulator, a de-interleaver, a channel decoder, and such.

The message processor 404 extracts control information from a signal provided from the reception modem 402 and provides the control information to the controller 406.

The controller 406 controls a general operation of the UE.

The controller 406 controls to feed back ACK/NACK to a Base Station (BS). For example, the controller 406 controls to feed back ACK/NACK to the BS according to the ACK/NACK feedback mode selected by the HARQ controller 408.

The HARQ controller 408 selects the ACK/NACK feedback mode according to criteria for selecting a proper ACK/NACK feedback mode. For example, the basis for selecting a proper ACK/NACK feedback mode may be the value of M, the number of CCs configured for the UE to receive, or whether MIMO is adopted for downlink data transmission. Alternatively, the basis may be the total number of CWs in all the CCs that are configured for the UE to receive, and is irrelevant to the value of M. The basis may also be the maximum number of TBs in all the CCs configured for the UE, the number of bits needed for feeding back ACK/NACKs in uplink, or any combination of the above mentioned bases.

The message generator 410 generates a control message to be the ACK/NACK feedback according to the control of the controller 406.

The transmission modem 412 encodes and converts data to be transmitted to an MS and a control message provided from the message generator 408, into an RF signal, and transmits the RF signal to the duplexer 400. The transmission modem 412 may include a channel encoding block, a modulation block, an RF processing block and so forth. The channel encoding block is composed of a modulator, an interleaver, a channel encoder and so forth. The modulation block is composed of an Inverse Fast Fourier Transform (IFFT) operator and such for mapping a signal provided from the channel encoding block to each subcarrier. The RF processing block converts a baseband signal provided from the modulation block into an RF signal and outputs the RF signal to the duplexer 400.

It can be seen that the method provided by the present invention can help to avoid excessive overhead for feedback in uplink in various extreme circumstances while ensuring satisfying downlink performance under many configurations. As such, uplink feedback in various situations has similar amount of overhead, thereby eliminating the need of designing dedicated feedback channels and feedback manners for extreme situations where an ACK/NACK of the maximum number of bits is to be fed back. Consequently, requirements, implementation complexity, and difficulty level of devices may be reduced.

Although the present disclosure has been described with an embodiment, various changes and modifications may be suggested to one skilled in the art. It is intended that the present disclosure encompass such changes and modifications as fall within the scope of the appended claims.

What is claimed is:

1. A method for transmitting an Acknowledgement/Negative Acknowledgement indicator (ACK/NACK) in a Time Division Duplexing (TDD) system, the method comprising:
receiving a component carrier (CC) configuration for a user equipment (UE) and a transmission mode of each CC;
selecting an ACK/NACK feedback mode based on overhead information for feedback in an uplink, the overhead information determined based on the CC configuration and the transmission mode of each CC;
processing an ACK/NACK according to the selected feedback mode; and
transmitting the ACK/NACK in the uplink.

2. The method of claim 1, wherein the selected ACK/NACK feedback mode comprises one of a first ACK/NACK feedback mode and a second ACK/NACK feedback mode,
wherein processing the ACK/NACK according to the first ACK/NACK feedback mode comprises:
performing no bundling procedure for the ACK/NACK, and
directly transmitting one ACK/NACK of each transmission block in the uplink, and
wherein processing the ACK/NACK according to the second ACK/NACK feedback mode comprises:
compressing the ACK/NACK, and
transmitting the compressed ACK/NACK in the uplink.

3. The method of claim 2, wherein compressing the ACK/NACK comprises:
performing bundling on each code word (CW) of the ACK/NACK for data transmitted in up to M sub-frames of a CC, wherein M is a number of sub-frames.

4. The method of claim 2, wherein compressing the ACK/NACK comprises:
obtaining the ACK/NACK by spatially bundling each sub-frame and bundling ACK/NACKs of up to M sub-frames after the spatial bundling, wherein M is a number of sub-frames.

5. The method of claim 1, wherein selecting an ACK/NACK feedback mode comprises:
selecting an ACK/NACK transmission mode based on an M number of sub-frames.

6. The method of claim 1, wherein selecting an ACK/NACK feedback mode comprises:

selecting an ACK/NACK transmission mode based on a number of CCs configured by a base station for the UE to receive.

7. The method of claim 1, wherein selecting an ACK/NACK feedback mode comprises:
selecting an ACK/NACK transmission mode based on a number of transmission blocks (TBs) configured by a base station for the UE to receive.

8. The method of claim 1, wherein selecting an ACK/NACK feedback mode comprises:
determining a maximum number of bits for feeding back an ACK/NACK; and
selecting an ACK/NACK transmission mode based on the maximum number.

9. The method of claim 8, wherein determining the maximum number of bits for feeding back an ACK/NACK comprises determining the number of bits needed for feeding back an ACK/NACK without any bundling.

10. The method of claim 1, wherein selecting an ACK/NACK feedback mode comprises:
selecting an ACK/NACK transmission mode based on a total number of CWs in all CCs received by the UE.

11. An apparatus for transmitting an Acknowledgement/Negative Acknowledgement indicator (ACK/NACK) in a Time Division Duplexing (TDD) system, the apparatus comprising:
a receiver configured to receive a component carrier (CC) configuration for a user equipment (UE) and a transmission mode of each CC;
a hybrid automatic repeat request (HARQ) controller configured to select an ACK/NACK feedback mode based on overhead information for feedback in an uplink, the overhead information determined based on the CC configuration and the transmission mode of each CC; and
a transmitter configured to process an ACK/NACK according to the selected feedback mode and transmit the ACK/NACK in the uplink.

12. The apparatus of claim 11, wherein the HARQ controller is further configured to:
perform no bundling procedure for the ACK/NACK, and directly feedback an ACK/NACK of each transmission block when a first ACK/NACK feedback mode is selected; and
compress the ACK/NACK such that a number of bits of the ACK/NACK is reduced when a second ACK/NACK feedback mode is selected.

13. The apparatus of claim 12, wherein the transmitter is further configured to, when compressing the ACK/NACK, perform bundling on each code word (CW) of the ACK/NACK for data transmitted in up to M sub-frames of a CC, wherein M is a number of sub-frames.

14. The apparatus of claim 12, wherein the transmitter is further configured to, when compressing the ACK/NACK, obtain the ACK/NACK by spatially bundling each sub-frame and bundling ACK/NACKs of up to M sub-frames after the spatial bundling, wherein M is a number of sub-frames.

15. The apparatus of claim 11, wherein the HARQ controller is further configured to select an ACK/NACK transmission mode based on an M number of sub-frames.

16. The apparatus of claim 11, wherein the HARQ controller is further configured to select an ACK/NACK transmission mode based on a number of CCs configured by a base station for the UE to receive.

17. The apparatus of claim 11, wherein the HARQ controller is further configured to select an ACK/NACK transmission mode based on a number of transmission blocks (TBs) configured by a base station for the UE to receive.

18. The apparatus of claim 11, wherein the HARQ controller is further configured to determine a maximum number of bits for feeding back an ACK/NACK.

19. The apparatus of claim 18, wherein the HARQ controller is further configured to determine the maximum number of bits for feeding back an ACK/NACK without any bundling.

20. The apparatus of claim 11, wherein the HARQ controller is further configured to select an ACK/NACK transmission mode based on a total number of CWs in all CCs received by the UE.

* * * * *